(12) United States Patent
Zhang

(10) Patent No.: US 7,211,763 B2
(45) Date of Patent: May 1, 2007

(54) PHOTON ENERGY MATERIAL PROCESSING USING LIQUID CORE WAVEGUIDE AND A COMPUTER PROGRAM FOR CONTROLLING THE SAME

(75) Inventor: Wenwu Zhang, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 11/021,015

(22) Filed: Dec. 22, 2004

(65) Prior Publication Data
US 2006/0133752 A1   Jun. 22, 2006

(51) Int. Cl.
*B23K 26/36* (2006.01)
*B23K 26/06* (2006.01)
*G02B 6/032* (2006.01)

(52) U.S. Cl. .......................... 219/121.73; 219/121.64; 219/121.68; 385/125; 700/166

(58) Field of Classification Search ............ 385/125, 385/142; 219/121.6, 121.73, 121.63, 121.64, 219/121.68, 121.69, 121.85; 700/166
See application file for complete search history.

(56) References Cited

U.S. PATENT DOCUMENTS

| | | | | |
|---|---|---|---|---|
| 3,995,934 A | * | 12/1976 | Nath | ........................ 385/125 |
| 4,403,134 A | | 9/1983 | Klingel | ........................ 219/121 |
| 4,732,450 A | * | 3/1988 | Lee | ........................ 385/33 |
| 5,323,269 A | * | 6/1994 | Walker et al. | ........... 219/121.62 |
| 5,736,709 A | * | 4/1998 | Neiheisel | ............. 219/121.75 |
| 5,889,254 A | * | 3/1999 | Jones | ................... 219/121.63 |
| 5,932,120 A | * | 8/1999 | Mannava et al. | ...... 219/121.85 |
| 6,163,641 A | * | 12/2000 | Eastgate | ................... 385/125 |
| 6,300,986 B1 | | 10/2001 | Travis | ........................ 349/5 |
| 6,418,257 B1 | * | 7/2002 | Nath | ........................ 385/125 |
| 6,670,578 B2 | * | 12/2003 | Hackel et al. | ........... 219/121.6 |
| 7,006,887 B2 | * | 2/2006 | Nagano et al. | ............. 700/120 |
| 2001/0033400 A1 | | 10/2001 | Sutherland et al. | ........... 359/15 |
| 2002/0110839 A1 | | 8/2002 | Bach et al. | ................... 435/7.9 |
| 2002/0117485 A1 | * | 8/2002 | Jones et al. | ............ 219/121.64 |

(Continued)

FOREIGN PATENT DOCUMENTS

EP   0929978 B1   5/2002

(Continued)

OTHER PUBLICATIONS

J. Majumder, P.S. Mohanty & A. Kar; "Mathematical modelling of laser materials processing"; Int. J. of Materials and Product Technology. vol. 11, Nos. 3/4 1996; pp. 193-194.

(Continued)

*Primary Examiner*—Geoffrey S. Evans
(74) *Attorney, Agent, or Firm*—Fletcher Yoder

(57) ABSTRACT

A liquid core waveguide photon energy material processing system is provided. The system includes a photon energy source configured to generate a high intensity photon beam for material processing. The system also includes a liquid core waveguide configured to transmit the high intensity photon beam towards at least one object for material processing. The liquid core waveguide in-turn includes a liquid core having a first refractive index and a cladding element having a second refractive index and configured to guide the liquid core, wherein the first refractive index is higher than the second refractive index. The system further includes a liquid source configured to generate the liquid core. The liquid core includes a liquid solution.

21 Claims, 3 Drawing Sheets

U.S. PATENT DOCUMENTS

2002/0168677 A1    11/2002    Fagan ........................... 435/6

FOREIGN PATENT DOCUMENTS

| | | | |
|---|---|---|---|
| JP | 3-27866 A | * | 2/1991 |
| WO | WO 02/088686 | | 11/2002 |

OTHER PUBLICATIONS

Wenwu Zhang & Y. Lawrence Yao; "Microscale Laser Shock Processing- Modeling, Testing, and Microstructure Characterization"; Journal of Manufacturing Processes, vol. 3/No. 2, 2001; pp. 128-143.

* cited by examiner

PHOTON ENERGY MATERIAL PROCESSING USING LIQUID CORE WAVEGUIDE AND A COMPUTER PROGRAM FOR CONTROLLING THE SAME

BACKGROUND

The present invention relates generally to material processing using photon energy and more specifically to a method and system for high photon energy material processing using a liquid core waveguide.

During material processing, such as machining, thermal treatment, and laser shock peening, for example, high intensity energy sources, such as photon energy sources, are often implemented. While using a photon energy source, such as a laser, the photon energy may be transmitted through a medium called a waveguide and directed towards a target or material to be processed. In order to make the process efficient and avoid over-heating the waveguide, the energy loss during the transmission of photon energy should be very low. A principle, called total internal reflection (TIR), facilitates efficient transmission of photon energy through waveguides. Total internal reflection (TIR) is a phenomenon by which an electromagnetic wave is completely reflected when it travels from a medium of high refractive index to a medium of lower refractive index with an incident angle greater than a critical angle.

In order to meet the criteria for TIR, a solid core waveguide consisting of a solid core fiber having a high refractive index surrounded by a cladding having a low refractive index is often used in photon energy transmission. The use of a solid core fiber is effective in the telecommunication industry, which uses photon energy on the order of less than 1 watt/square centimeter (w/cm$^2$), which is several orders lower than that used in material processing, which is typically higher than $10^4$ w/cm$^2$.

Disadvantageously, solid core fibers have inherent difficulties in transmitting high peak energy intensities or high average powers due to the presence of defects in solids. The defects in the solids scatter and absorb the incident photon energy, and thus, the defects act as local heat centers. When either the peak energy intensity or the average power is high, the solid core fiber distorts so much that the TIR condition is destroyed, and the solid core fiber eventually breaks down. Lasers with nanosecond or even shorter pulse durations are widely used in research and industry, but currently the solid core fibers cannot be used for such pulsed lasers due to the energy limitations mentioned above. Improving the purity of the solid core fiber may improve the transmission of photon energy using a solid core fiber. However, even with improved purity, solid core fibers pose some limitations. For example, even with a high purity ruby, the intensity of laser that can be transmitted through a solid core fiber is typically lower than $10^8$ w/cm$^2$. Furthermore, improving the purity of the solids also increases the cost of the solid core fibers.

Another method of transmitting photon energy is to use a hollow waveguide. A hollow waveguide relies on reflection of photon energy by smooth surfaces. Unlike TIR, each air-solid reflection has certain energy loss. Disadvantageously this makes the method of using a hollow waveguide less efficient and thus, introduces certain application limitations. Further, hollow waveguides also have the same limitations as solid core fibers, since any solid material may be damaged when exposed to high energies. Even glass, which is generally transparent to laser energy, may be damaged when exposed to energies greater than $10^9$ w/cm$^2$.

Furthermore, material processing using high-intensity photon energy is accompanied by thermal effects, which may be undesirable. For example, in laser machining using nanosecond or longer pulse durations, the machined region has a heat-affected zone (HAZ), which usually has tensile stress distributions. Thus, in addition to the problems set forth above, laser machining in air or a vacuum may also result in melting of the target, re-deposition of the target residue and attachment of the residue that may require post-processing.

Yet another method of transmitting photon energy is to use a liquid medium, such as a water jet in air, to transmit and confine an energy beam. Disadvantageously, the length of energy transmission is limited and the TIR effects due to water-air interface disappear once the water jet hits the target. Furthermore, bubbles will be formed during laser material processing. As will be appreciated, bubble formation generally lowers the process quality and limits its application. The bubble issue and the length issue mentioned above are not well solved in water jet laser energy transmission.

Thus, there exists a need for an improved method and system for material processing using photon energy techniques. More specifically, there is a need for an improved waveguide for flexibly transmitting high intensity photon energy and a method for improving the quality of material processing.

BRIEF DESCRIPTION

In accordance with one embodiment, the present technique provides a liquid core waveguide photon energy material processing system. The system includes a photon energy source configured to generate a high intensity photon beam for material processing. The system also includes a liquid core waveguide configured to transmit the high intensity photon beam towards at least one object for material processing. The liquid core waveguide in-turn includes a liquid core having a first refractive index and a cladding element having a second refractive index and configured to guide the liquid core, wherein the first refractive index is higher than the second refractive index. The system further includes a liquid source configured to generate the liquid core. The liquid core includes a liquid solution.

In accordance with one aspect of the present technique, a method of photon energy material processing is provided. The method includes generating a high intensity photon beam. The method also includes generating a liquid core waveguide. Generating the liquid core waveguide includes guiding a liquid core having a first refractive index through a cladding element having a second refractive index, wherein the first refractive index is higher than the second refractive index. The method further includes transmitting the high intensity photon beam through the liquid core waveguide towards at lease one object for material processing, wherein a first end of the liquid core waveguide is coupled to a photon source and a second end of the liquid core waveguide is positioned proximate to the object.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As a preliminary matter, the definition of the term "or" for the purpose of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA."

The present technique is generally directed towards material processing using photon energy. Different levels of photon energy intensity correspond to different material processing processes. For example, laser transformation hardening and laser aided manufacturing are performed at photon energy intensities of around $10^3$ to $10^4$ watts/square centimeter (w/cm$^2$) and laser machining is typically performed at photon energy intensities around $10^6$ to $10^8$ w/cm$^2$, whereas laser shock peening or laser shock hardening is typically performed above a photon energy intensity of $10^8$ w/cm$^2$. As will be appreciated by those of ordinary skill in the art, the present techniques may also be applied in various applications, which include but not limited to laser machining, laser surface thermal treatment, laser forming, laser consolidation, laser welding, and laser shock peening. To facilitate explanation of the present techniques, however, a general material processing implementation will be discussed herein, though it should be understood that other implementations are also within the scope of the present techniques.

Figure 1:
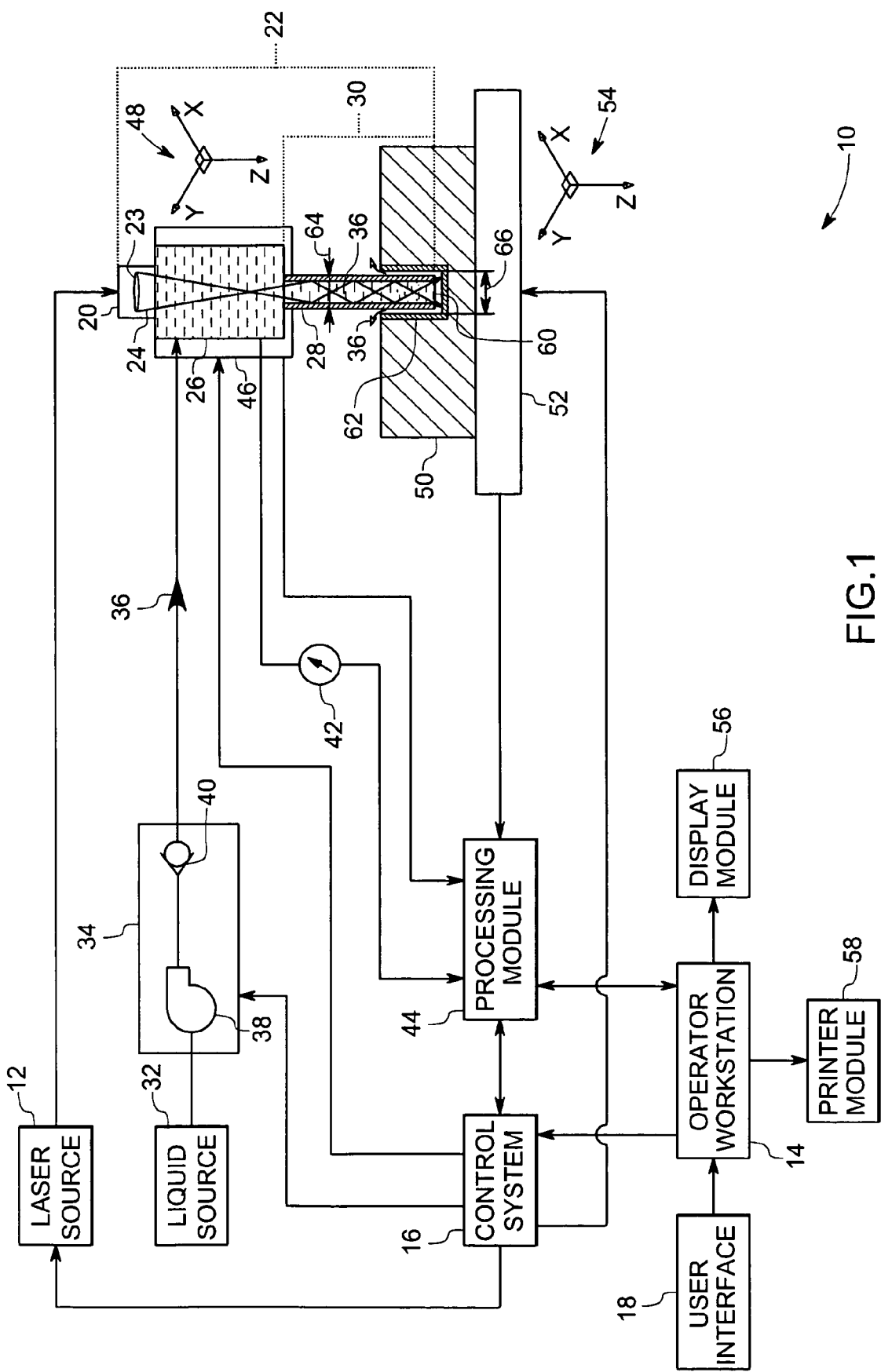
FIG. 1 is a diagrammatic representation of an exemplary photon energy material processing system, employing a liquid core waveguide, in accordance with an embodiment of present technique.

Turning now to the drawings, and referring first to FIG. 1, an exemplary embodiment of a photon energy material processing system 10 employing a liquid core waveguide is illustrated. The system 10 includes a photon energy source such as a laser source 12. Other types of photon energy sources are also envisaged. Solar energy source, a light emitting diode, a high power arc light, a high power quartz lamp are to name but few examples of photon energy source. An operator may control the operation of the laser source 12 through an operator workstation 14 and a control system 16. The operator may communicate with the operator workstation 14 through a user interface 18, which may include input devices such as a keyboard, a mouse, and other user interaction devices.

The laser source 12 is configured to generate a high intensity pulsed or continuous wave (CW) laser beam with an intensity on the order of $10^3$ w/cm$^2$ and beyond for material processing. According to a particular embodiment, the laser source 12 may have a wavelength in a range of about 355 nanometers (nm) to 1100 nm. In the exemplary embodiment, as depicted in FIG. 1, laser source 12 is coupled to a front window 20 of a liquid core waveguide assembly 22. The front window 20 also includes a focusing unit or a photon energy-coupling unit 23. The front window 20 and the focusing unit 23 facilitate transmission of laser beam 24 towards a material to be processed through a liquid core waveguide as described further below. The liquid core waveguide assembly 22 further includes a liquid cavity 26 and a cladding element 28. The liquid cavity 26 facilitates flow of transparent liquid (i.e., the liquid core) through the cladding element 28 in addition to transmission of laser beam 24. A flow of liquid from the transparent liquid cavity 26 through the cladding element 28 provides a liquid core waveguide 30. In one exemplary embodiment, the cladding element 28 may be a poly-tetra-fluoro-ethylene (PTFE) tube, and water may be used as the liquid core to provide the liquid core waveguide 30. Use of other types of materials for the cladding element 28 and other types of liquid or liquid solutions for the liquid core are also envisaged. For example, the cladding element may include, but not limited to, fused silica, fluoride glass and/or the combinations thereof. Similarly, liquids may include, but not limited to, acetone, decahydroponaphtalene, such as DECALIN® owned by DuPont and/or the combinations thereof. Exemplary liquid solutions include the solutions of choleric acid (HCl), sulfuric acid ($H_2SO_3$), nitric acid and/or the combinations thereof. The material for the cladding element 28 and the liquid are selected such that the combination of the cladding element 28 and the liquid that flows through the cladding element 28 facilitate a total internal reflection for efficient transmission of laser beam 24. In other words, as described above, the refractive index of the cladding element 28 is lower that that of the core of the wave guide, in order to achieve the total internal reflection. Hence the exemplary embodiment uses PTFE with a refractive index of 1.29 as the cladding element 28 of the waveguide 30 and water with a refractive index of 1.33 as the liquid core of the waveguide 30. The liquid core waveguide 30, as described above, facilitates transmission of laser beam intensity of up to about $10^{10}$ w/cm$^2$ at a wavelength of 532 nm with a transmission efficiency of 94%. The exemplary embodiment facilitates transmission of high average power along with high peak laser beam intensity.

In the exemplary embodiment, the system 10 also includes a liquid source 32 coupled to a pressure source 34 to provide pressurized liquid 36 to the liquid cavity 26. Hence, in the present embodiment, liquid core waveguide 30 includes pressurized water 36 and the PTFE cladding element 28. One exemplary pressure source 34 includes a pump 38 and a valve 40. Another exemplary pressurized fluid source is a step motor drive constant pressure syringe (in a range of about 100–500 mega-pascals). Use of other types of components in the pressure source 34 is also envisaged, such as gravity feeding of the liquid. The pressure source 34 is further coupled to the control system 16, which controls the functioning of the pressure source 34, and thereby regulates the pressure of the liquid being delivered to the transparent liquid cavity 26. A pressure-sensing device 42 coupled to the transparent liquid cavity 26 senses the liquid pressure and provides the information to a processing module 44, which in-turn provides instructions to the control system 16 to regulate the pressure of the liquid. The present embodiment uses a pressure gage as the pressure-sensing device. However, other types of pressure-sensing devices may also be used. By way of example, the processing module 44 includes hardware and/or software components that facilitate the material processing.

For the configuration of FIG. 1, the liquid core waveguide assembly 22 is coupled to a waveguide holder 46. The waveguide holder 46 may be movable in one, two or three dimensions (as indicated by a first coordinate system 48) to different locations, by automated means, to facilitate positioning the liquid core waveguide assembly 22 with respect to an object or workpiece 50 to be processed. The materials that could be processed may include metals or ceramics, to name but few examples. The operator may command the motion of the waveguide holder 46 through the operator workstation 14. The operator workstation 14 sends the instructions to the processing module 44. The processing module 44 reads the instructions from the operator workstation 14 and the current position of the waveguide holder 46 and generates another set of instructions to be transmitted to the control system 16. The control system 16 then controls the motion of the waveguide holder 46 in accordance with the set instructions from the processing module 44.

For the exemplary configuration of FIG. 1, the workpiece 50 is disposed on a workpiece holder 52. However, for certain applications involving processing a large workpiece, such as, processing a part of an aircraft fuselage or a marine vessel, the workpiece holder is not employed. The workpiece holder 52 may also be movable in one, two or three dimensions (as indicated by a second coordinate system 54) to different locations, by automated means, to facilitate positioning of the workpiece 50 with respect to the waveguide holder 46 to facilitate material processing. Similar to the waveguide holder 46, the operator may also command the motion of the workpiece holder 52 through the operator workstation 14, as described above. The operator workstation 14 is typically connected to a display 56 and/or to a printer 58 to display the data.

In the present embodiment, the material processing occurs adjacent to the tip 60 of the liquid core waveguide 30, proximate to the workpiece 50. In one exemplary embodiment, the material processing occurs outside the workpiece 50, i.e., the liquid waveguide is outside the workpiece. Alternatively, the material processing may also occur inside the workpiece 50, such as machining a hole by gradually feeding the liquid core waveguide into the workpiece. Further, the flow of liquid 36 at high pressure during machining facilitates removal of the machined metal particles, thereby exposing a new surface of the workpiece 50 for material processing or machining. Thus, the present embodiment facilitates machining without conventional laser machining depth limitation besides improving the efficiency of machining process. The present embodiment can facilitate a machining to a depth as high as about 100 centimeters (cm). The present technique increases the depth of material processing by facilitating the transmission of large length energy at high intensity and high average power. For example, the present technique facilitates the transmission of laser energy with a wavelength of 532 nm over a length of about 20 meters with around 30% of input energy still remaining. Further, in certain applications, such as, laser drilling or laser shock-peening operations, high laser intensity may be employed to initiate plasma. While, in other applications, such as, laser forming, lower laser intensities may be employed, without initiating plasma. As will be appreciated by those skilled in the art, plasma expands under liquid confinement, thus a larger area than a direct laser irradiation can be machined.

During material processing inside the workpiece 50, the diameter of the waveguide 30 defines the diameter of the hole to be machined, i.e. a waveguide with a diameter, as indicated by the reference numeral 64, marginally smaller than the inner diameter, as indicated by the reference numeral 66 of the hole to be machined may be used. The spatial resolution and the geometry of the waveguide may be changed as required. The spatial resolution depends on the inner diameter of the waveguide. The inner diameter of the waveguide can be in tens of microns for micromachining, several millimeters for coarse laser machining and tens of millimeters for thermal treatment. The shape of a cross-section of the waveguide may be a circle, an oval, a polygon, and/or others similar shapes. Suitable conditions may be met to feed the waveguide into the material.

Further, the flow of liquid 36 also cools the area being machined, thereby reducing the heat-affected zone 62. The "heat-affected zone" is the zone near the surface of the workpiece being machined and this zone usually negatively affects the properties of the workpiece 50. Hence it is desirable to minimize the heat-affected zone during material processing. Advantageously, in the present embodiment, the laser source is configured to generate a pulsed or CW laser beam 24, which in turn generates laser shocks. Both water-cooling and laser shocks may improve the quality of machining by reducing the melting layer and breaking the melting layer into small particles. Thus the various aspects of the present embodiment, as described above, improve the quality of material processing or machining, thereby mitigating the need for post processing.

Figure 2:
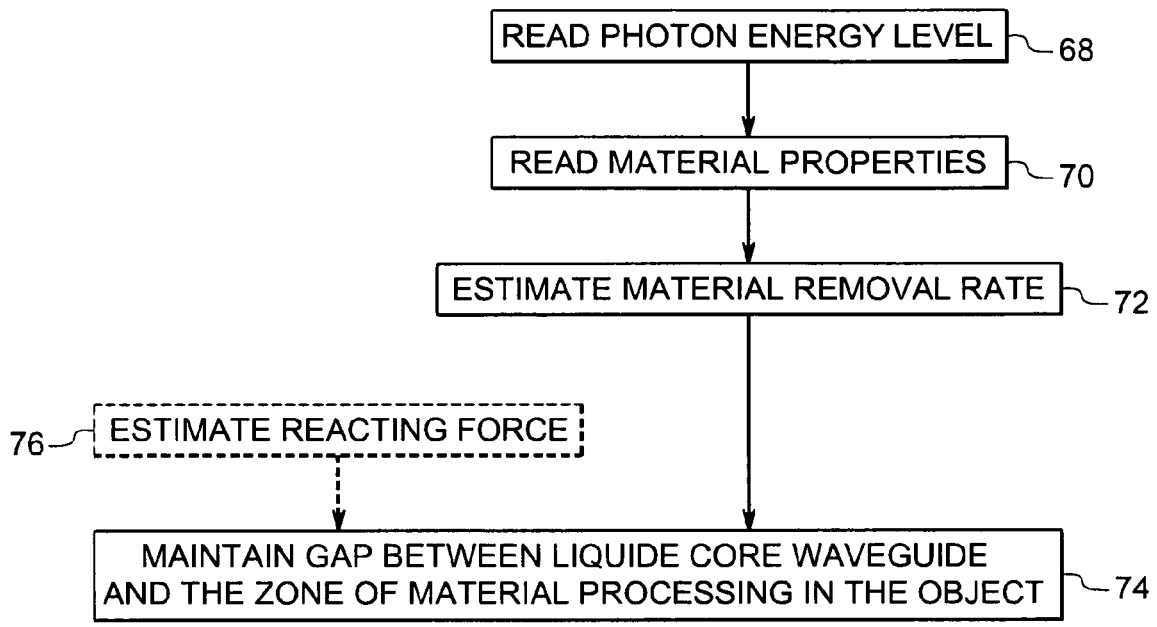
FIG. 2 is a flowchart illustrating exemplary process steps for determining the gap between a liquid core waveguide and an object being processed, in accordance with aspects of present technique.

FIG. 2 is a flowchart illustrating exemplary process steps for determining the gap between a liquid core waveguide and an object being processed, in accordance with aspects of present technique. The process includes reading photon energy intensity, as in step 68. The process also includes reading or analyzing material properties, as in step 70. Then the rate at which the material could be removed is estimated based on the photon energy intensity and the material properties, as in step 72. Finally the liquid core waveguide or the object being machined may be moved so that an optimum gap is maintained while machining, based on the material removal rate, as in step 74. Alternatively, the optimum gap may also be maintained, as in step 74 by estimating the reacting force generated by the water flow and the laser shock during the material processing, as in step 76.

Figure 3:
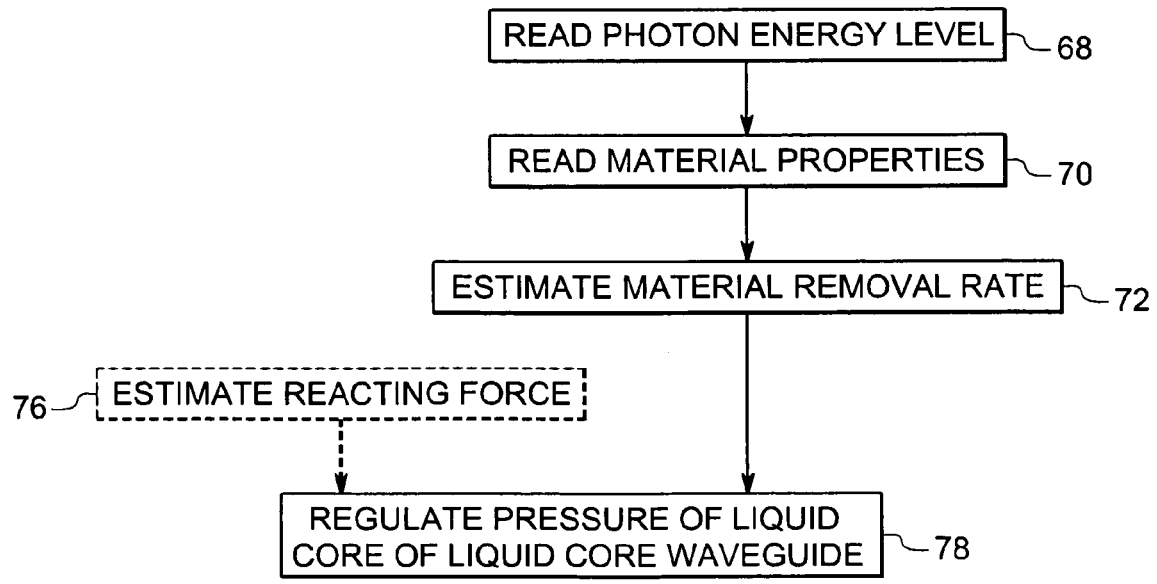
FIG. 3 is a flowchart illustrating exemplary process steps for regulating a pressure of liquid of a liquid core waveguide, in accordance with aspects of present technique.

Keeping FIG. 2 in mind, FIG. 3 is a flowchart illustrating exemplary process steps for regulating a pressure of liquid of a liquid core waveguide, in accordance with aspects of present technique. The process includes reading the photon energy intensity as in step 68 and analyzing the material properties, as in step 70. As described above, the material removal rate is estimated based on the photon energy intensity and the material properties, as in step 72. The pressure of the flow of liquid is regulated based on the material removal rate to remove the machined material particles, as in step 78. Alternatively, the pressure of the flow of liquid may also be regulated, as in step 78 by estimating the reacting force of step 76.

Figure 4:
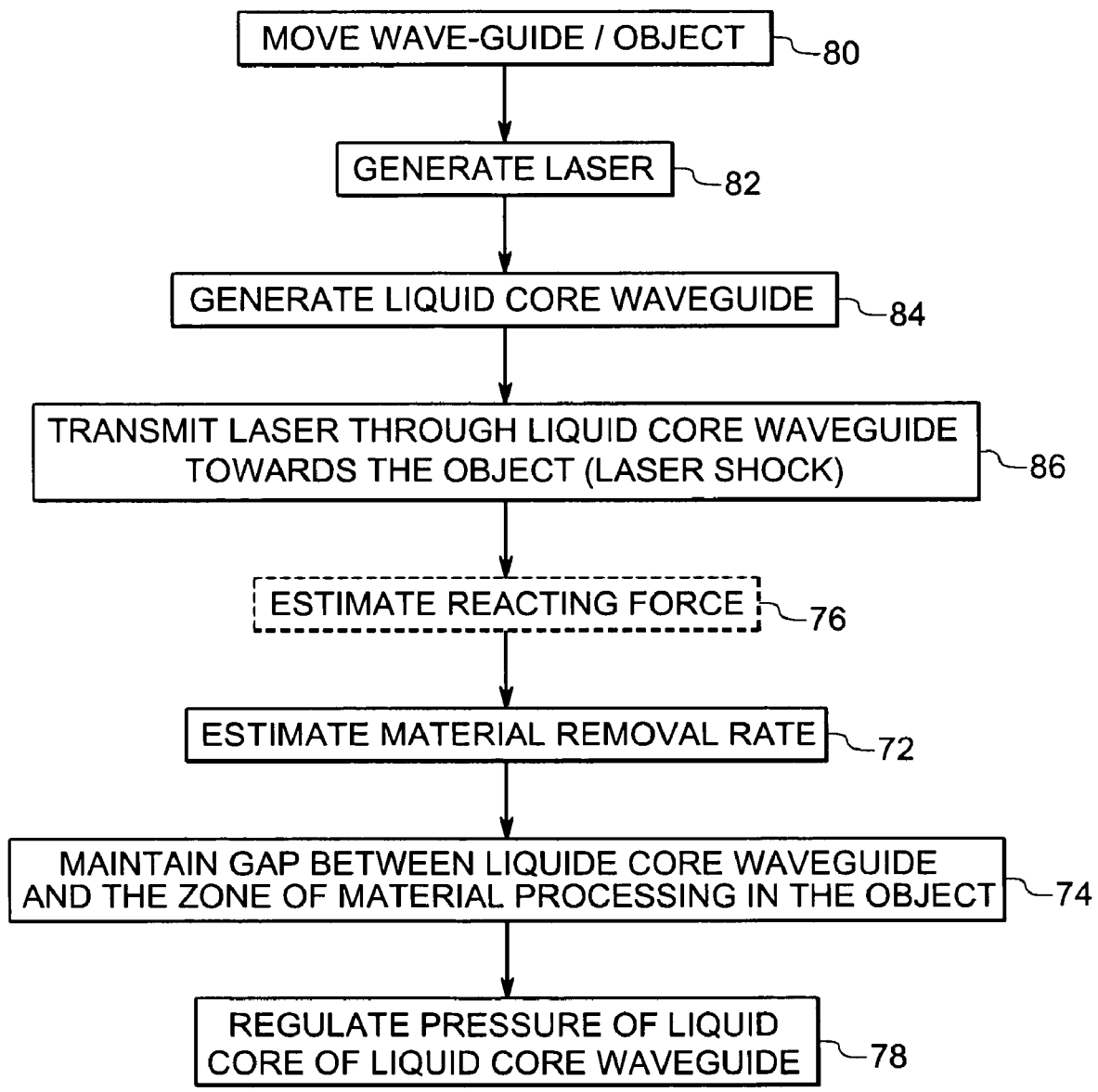
FIG. 4 is a flowchart illustrating exemplary process steps for material processing using photon energy transmitted through a liquid core waveguide, in accordance with aspects of present technique.

Keeping FIGS. 1–3 in mind, FIG. 4 is a flowchart illustrating exemplary process steps for material processing using photon energy transmitted through a liquid core waveguide, in accordance with aspects of present technique. The process includes moving the liquid core waveguide 30 or the object (workpiece) 50 being machined proximate to each other for machining, as in step 80. The operator may command the laser source 12 to generate a high-energy laser beam through the operator workstation 14 and the control system 16, as in step 82. The flow of liquid through the cladding element 28 creates the liquid core waveguide 30, as in step 84. Then the high-energy laser beam is transmitted through the liquid core waveguide 30 due to total internal reflection towards the object 50, as in step 86. As described in FIG. 2, the material removal rate is estimated as in step 72 and the gap is maintained between the tip 60 of liquid core waveguide 30 and the object 50, by moving the liquid core waveguide 30 or the object 50 towards each other, as in step 74. Alternatively, the gap between the tip 60 of liquid core waveguide 30 and the object 50 of step 74 may also be maintained by estimating the reacting force, as in step 76. Then, as described in FIG. 3, the pressure of flow of liquid is regulated based on the estimation of the material removal rate, as in step 78.

As will be also appreciated, the above-described techniques may take the form of computer or controller implemented processes and apparatuses for implementing those processes. The above-described technique can also be embodied in the form of computer program code containing instructions for material processing or machining process. The computer program code may be embodied in tangible media, such as floppy diskettes, CD-ROMs, hard drives, or any other computer-readable storage medium. The computer program code is loaded into and executed by a computer or controller; the computer becomes an apparatus for practicing the technique. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technique.

The present technique facilitates transmission of high intensity and high average power laser energy in addition to providing access to narrow locations or area for material processing. Thus the present technique facilitates laser welding, laser cladding, laser forming, rapid prototyping, rapid tooling and/or free form fabrication, to name but few examples of laser material processing applications.

In accordance with one aspect, the present technique facilitates laser-forming process. In the laser-forming process, the liquid core waveguide scans the laser energy across the metal structure such as a metal plate, to induce high thermal stress to permanently deform the metal structure into desired geometry. This technique provides high spatial resolution and high processing speed as the thermal field is localized due to liquid cooling.

In accordance with another aspect, the present technique facilitates layered fabrication process. In layered fabrication process, thermal energy sources are used to melt powders or wires onto a previous layer, or cut a layer and combine to the previous layer, or solidify a medium onto the previous layer. The layered fabrication technique facilitates fabricating complex three-dimensional objects in short cycle time. The liquid core waveguide may be used to deliver the photon energy as the thermal energy source in the layered fabrication process. During such layered fabrication process, the liquid core waveguide facilitates accessing narrow area and reducing undesirable thermal effects.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A liquid core waveguide photon energy material processing system, the system comprising:
   a photon energy source configured to generate a high intensity photon beam for material processing;
   a liquid core waveguide configured to transmit the high intensity photon beam towards at least one object for material processing, wherein the liquid core waveguide comprises a liquid core having a first refractive index and a cladding element having a second refractive index and configured to guide the liquid core, wherein the first refractive index is higher than the second refractive index;
   a liquid source configured to generate the liquid core, wherein the liquid core comprises a liquid; and
   a control system configured to control a pressure of the liquid core of the liquid core waveguide by determining a material removal rate or by determining a reacting force from the material processing.

2. The system of claim 1, wherein the photon energy source is selected from a group consisting of a laser, a solar energy source, an infrared light source, a light emitting diode, a high power arc light, or a high power quartz lamp.

3. The system of claim 1, wherein the photon energy source comprises a laser configured to generate a continuous wave (CW) laser or pulsed laser beam.

4. The system of claim 1, wherein the liquid core is selected from a group consisting of water, acetone, decahydroponaphthalene, acid solutions, alkaline solutions, salt solutions or combinations thereof.

5. The system of claim 1, wherein the cladding element is selected from a group consisting of poly-tetra-fluoro-ethylene (PTFE), fused silica, fluoride glass, or combinations thereof.

6. The system of claim 1, wherein the liquid core is pressurized.

7. The system of claim 1, wherein the control system is further configured to position the object or the liquid core waveguide proximate to each other, and wherein the liquid core waveguide comprises a flexible cladding element having a first end coupled to the photon energy source and a second end displaced proximate to the object.

8. A liquid core waveguide laser energy material processing system, the system comprising:
   a laser energy source configured to generate a high intensity laser beam for material processing;
   a liquid core waveguide configured to transmit the high intensity laser beam towards at least one object for material processing, wherein the liquid core waveguide comprises a liquid core having a first refractive index and a cladding element having a second refractive index and configured to guide the liquid core, wherein the first refractive index is higher than the second refractive index;
   a liquid source configured to generate the liquid core; and
   a control system configured to control a pressure of the liquid core of the liquid core waveguide by determining a material removal rate or by determining a reacting force from the material processing.

9. The system of claim 8, wherein the system is configured for laser machining the at least one object by removing material from the object to a depth of up to 100 centimeters.

10. The system of claim 8, wherein the liquid core comprises water and the cladding element comprises a poly-tetra-fluoro-ethylene (PTFE) tube.

11. The system of claim 8, wherein the liquid core waveguide is configured to transmit a laser beam intensity in the range of about $10^3$ to $10^{10}$ watts/ square centimeter.

12. A method of photon energy material processing, the method comprising:
    generating a high intensity photon beam;
    generating a liquid core waveguide, wherein generating the liquid core waveguide comprises guiding a liquid core having a first refractive index through a cladding element having a second refractive index, wherein the first refractive index is higher than the second refractive index;
    transmitting the high intensity photon beam through the liquid core waveguide towards at least one object for material processing, wherein a first end of the liquid core waveguide is coupled to a photon source and a second end of the liquid core waveguide is positioned proximate to the object; and
    regulating a pressure of the liquid core by determining a material removal rate or by determining a reacting force from the material processing.

13. The method of claim 12, wherein generating the photon beam comprises generating a laser beam, and wherein the liquid core waveguide transmits the laser beam on a metal structure to induce a thermal stress, wherein the induced thermal stress plastically and permanently deforms the metal structure into a desired geometry.

14. The method of claim 12, comprising positioning the liquid core waveguide or the object proximate to each other.

15. The method of claim 12, wherein generating the photon beam comprises generating a laser beam and wherein the photon energy material processing comprises laser shock peening a surface of the at least one object by applying a plurality of laser beam pulses to the surface of the at least one object to form a plasma and shockwave therein, confining the plasma adjacent the surface to plastically deform the surface by the shock wave to form a plurality of compressive stresses on the surface of the at least one object.

16. The method of claim 12, further comprising determining a material removal rate and maintaining a gap between the second end of the liquid core waveguide and a zone of material processing in the object in accordance with the material removal rate or by determining a reacting force from the material processing.

17. The method of claim 12, wherein generating the photon beam comprises generating a laser beam, and wherein the liquid core waveguide delivers laser energy for layer-by-layer additive processes for laser consolidation, rapid prototyping or rapid tooling.

18. The method of claim 12, wherein generating the photon beam comprises generating a laser beam, and wherein the liquid core waveguide transmits the laser beam towards a tip of a wire, and wherein the material processing comprises cladding the wire onto a substrate.

19. The method of claim 12, wherein generating the photon beam comprises generating a laser beam, and wherein the liquid core waveguide transmits the laser beam towards a tip of a filler wire, and wherein the material processing comprises welding a first workpiece to a second workpiece with the filler wire.

20. A computer program for photon energy material processing, the computer program being disposed on one or more tangible media, the computer program comprising:
    a code for controlling a photon energy source to generate photon energy, the photon energy being configured to travel through a liquid core waveguide, wherein a first end of the liquid core waveguide is coupled to the photon energy source and a second end of the liquid core waveguide is displaced proximate to an object for material processing;
    a code providing instructions to move the liquid core waveguide or the object proximate to each other for material processing; and
    a code providing instructions to determine a material removal rate based on the photon energy from the photon energy source and material property of the object.

21. The computer program of claim 20, further comprising a code adapted to maintain a gap between the second end of the liquid core waveguide and a zone of material processing in the object or to regulate a pressure of a liquid core of the liquid core waveguide based on the material removal rate or by determining a reacting force from the material processing.

* * * * *